(12) United States Patent
Lo et al.

(10) Patent No.: US 11,970,373 B2
(45) Date of Patent: Apr. 30, 2024

(54) OVERHEAD HOIST TRANSFER (OHT) APPARATUS, GUIDING DEVICE OF OHT APPARATUS, AND DIRECTION MAINTAINING MODULE OF OHT APPARATUS

(71) Applicant: MIRLE AUTOMATION CORPORATION, Hsinchu (TW)

(72) Inventors: Cheng-Cheng Lo, Hsinchu (TW); Chuan-Ming Chung, Hsinchu (TW)

(73) Assignee: MIRLE AUTOMATION CORPORATION, Hsinchu (TW)

( * ) Notice: Subject to any disclaimer, the term of this patent is extended or adjusted under 35 U.S.C. 154(b) by 839 days.

(21) Appl. No.: 17/091,081

(22) Filed: Nov. 6, 2020

(65) Prior Publication Data

US 2021/0316968 A1 Oct. 14, 2021

Related U.S. Application Data

(60) Provisional application No. 63/006,943, filed on Apr. 8, 2020.

(30) Foreign Application Priority Data

Jul. 21, 2020 (TW) .................................. 109124578

(51) Int. Cl.
*B66C 19/00* (2006.01)
*B65G 43/08* (2006.01)
(Continued)

(52) U.S. Cl.
CPC .............. *B66C 19/00* (2013.01); *B65G 43/08* (2013.01); *B66C 7/08* (2013.01); *B66C 7/12* (2013.01);
(Continued)

(58) Field of Classification Search
CPC .. B60B 13/00; B66C 7/08; B66C 7/12; B66C 7/04; B66C 9/02; B66C 11/00; B66C 2700/018; B65G 43/08; B65G 2203/0283
See application file for complete search history.

(56) References Cited

U.S. PATENT DOCUMENTS 8,701,864 B2   4/2014  Ogawa et al.
9,061,839 B2 * 6/2015  Murayama ........ H01L 21/67715
(Continued)

FOREIGN PATENT DOCUMENTS

CN      103221611 A    7/2013
CN      203996231 U    12/2014
(Continued)

*Primary Examiner* — Scott A Browne
(74) *Attorney, Agent, or Firm* — Li & Cai Intellectual Property (USA) Office

(57) ABSTRACT

An overhead hoist transfer (OHT) apparatus, a guiding device of the OHT apparatus, and a direction maintaining module of the OHT apparatus are provided. The direction maintaining module includes a main channel, a first retaining channel and a second retaining channel that are spaced apart from the main channel, a switch channel, and a switching mechanism connected to the switch channel. The switch channel is disposed among the main channel, the first channel, and the second channel. The switching mechanism is configured to drive the switch channel to move between a turning position and a straight position. When the switch channel is at the turning position, the switch channel connects the main channel and the first retaining channel. When the switch channel is at the straight position, the switch channel connects the main channel and the second retaining channel.

18 Claims, 13 Drawing Sheets

(51) Int. Cl.
*B66C 7/08* (2006.01)
*B66C 7/12* (2006.01)
*B66C 9/02* (2006.01)
*B66C 11/00* (2006.01)
*G08C 17/02* (2006.01)

(52) U.S. Cl.
CPC ............ *B66C 9/02* (2013.01); *B66C 11/00* (2013.01); *G08C 17/02* (2013.01); *B65G 2203/0283* (2013.01); *B66C 2700/018* (2013.01)

(56) References Cited

U.S. PATENT DOCUMENTS

| | | |
|---|---|---|
| 9,212,454 B2 | 12/2015 | Yanobu et al. |
| 9,630,632 B2 | 4/2017 | Wada |

FOREIGN PATENT DOCUMENTS

| | | | |
|---|---|---|---|
| CN | 108455143 A | 8/2018 | |
| CN | 208808924 U | 5/2019 | |
| CN | 208869190 U | 5/2019 | |
| JP | 6398006 A | 4/1988 | |
| JP | 8113144 A | 5/1996 | |
| JP | 2004126720 A | 4/2004 | |
| JP | 2005186843 A | 7/2005 | |
| JP | 2012180643 A | 9/2012 | |
| JP | 2015199394 A | 11/2015 | |
| JP | 2020131985 A | 8/2020 | |
| TW | 201331106 A1 | 8/2013 | |
| TW | 201341287 A | 10/2013 | |
| WO | WO-2017075115 A1 * | 5/2017 | ............ B60L 13/006 |

* cited by examiner

OVERHEAD HOIST TRANSFER (OHT) APPARATUS, GUIDING DEVICE OF OHT APPARATUS, AND DIRECTION MAINTAINING MODULE OF OHT APPARATUS

CROSS-REFERENCE TO RELATED PATENT APPLICATION

This application claims the benefit of priority to Taiwan Patent Application No. 109124578, filed on Jul. 21, 2020. The entire content of the above identified application is incorporated herein by reference.

This application claims priority to the U.S. Provisional Patent Application Ser. No. 63/006,943 filed on Apr. 8, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a transfer apparatus, and more particularly to an overhead hoist transfer (OHT) apparatus, a guiding device of an OHT apparatus, and a direction maintaining module of an OHT apparatus.

BACKGROUND OF THE DISCLOSURE

A conventional OHT apparatus includes a rail module and an overhead trolley that is movably disposed on the rail module. The conventional OHT apparatus has been widely used in factories, and the structural design of the conventional OHT apparatus has become more mature, which has led those skilled in the art to neglect improvements to the conventional OHT apparatus.

SUMMARY OF THE DISCLOSURE

In response to the above-referenced technical inadequacies, the present disclosure provides an overhead hoist transfer (OHT) apparatus, a guiding device of an OHT apparatus, and a direction maintaining module of an OHT apparatus to effectively improve on the issues associated with conventional OHT apparatuses.

In one aspect, the present disclosure provides an overhead hoist transfer apparatus, which includes a rail module, a direction maintaining module assembled in the rail module, and an overhead trolley movably assembled to the rail module and the direction maintaining module. The rail module includes a main rail, a first rail curvedly connected to the main rail, and a second rail connected to the main rail. The rail module defines a turning path extending from the main rail to the first rail, and the rail module defines a straight path extending from the main rail to the second rail. The direction maintaining module includes a main channel, a first retaining channel, a second retaining channel, a switch channel, and a switching mechanism. The main channel is disposed in and extends along the main rail. The first retaining channel is disposed in and extends along the first rail. The first retaining channel is spaced apart from the main channel. The second retaining channel is disposed in and extends along the second rail. The second retaining channel is spaced apart from the main channel. The switch channel is disposed among the main channel, the first channel, and the second channel. The switching mechanism is connected to the switch channel and is configured to drive the switch channel to move between a turning position and a straight position. When the switch channel is at the turning position, the switch channel connects the main channel and the first retaining channel. When the switch channel is at the straight position, the switch channel connects the main channel and the second retaining channel. The overhead trolley includes a first walking mechanism and a carrying body. The first walking mechanism includes two driving wheels movably disposed on the rail module, a driving unit connected to the two driving wheels, and a first retainer that is movably coupled to the direction maintaining module. The carrying body is connected to the first walking mechanism and hung on the rail module. When the overhead trolley is moved from the main rail to the first rail along the turning path, the switch channel is arranged at the turning position, so that the first retainer is moved from the main channel to the first retaining channel through the switch channel. When the overhead trolley is moved from the main rail to the second rail along the straight path, the switch channel is arranged at the straight position, so that the first retainer is moved from the main channel to the second retaining channel through the switch channel.

In another aspect, the present disclosure provides a guiding device of an overhead hoist transfer apparatus, which includes a rail module and a direction maintaining module assembled in the rail module. The rail module includes a main rail, a first rail curvedly connected to the main rail, and a second rail connected to the main rail. The rail module defines a turning path extending from the main rail to the first rail, and the rail module defines a straight path extending from the main rail to the second rail. The direction maintaining module includes a main channel, a first retaining channel, a second retaining channel, a switch channel, and a switching mechanism. The main channel is disposed in and extends along the main rail. The first retaining channel is disposed in and extends along the first rail. The first retaining channel is spaced apart from the main channel. The second retaining channel is disposed in and extends along the second rail. The second retaining channel is spaced apart from the main channel. The switch channel is disposed among the main channel, the first channel, and the second channel. The switching mechanism is connected to the switch channel and is configured to drive the switch channel to move between a turning position and a straight position. When the switch channel is arranged at the turning position, the switch channel connects the main channel and the first retaining channel. When the switch channel is arranged at the straight position, the switch channel connects the main channel and the second retaining channel.

In yet another aspect, the present disclosure provides a direction maintaining module of an overhead hoist transfer apparatus for being assembled in a rail module. The direction maintaining module includes a main channel, a first retaining channel spaced apart from the main channel, a second retaining channel spaced apart from the main channel, a switch channel, and a switching mechanism. The switch channel is disposed among the main channel, the first channel, and the second channel. The switching mechanism is connected to the switch channel and is configured to drive the switch channel to move between a turning position and a straight position. When the switch channel is arranged at the turning position, the switch channel connects the main channel and the first retaining channel. When the switch channel is arranged at the straight position, the switch channel connects the main channel and the second retaining channel.

Therefore, in each of the OHT apparatus, the guiding device, and the direction maintaining module of the present disclosure, the switch channel can be driven by the switching mechanism so as to selectively connect the main channel to one of the first retaining channel and the second retaining channel, thereby facilitating the overhead trolley to accurately move along the direction maintaining module through the first retainer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
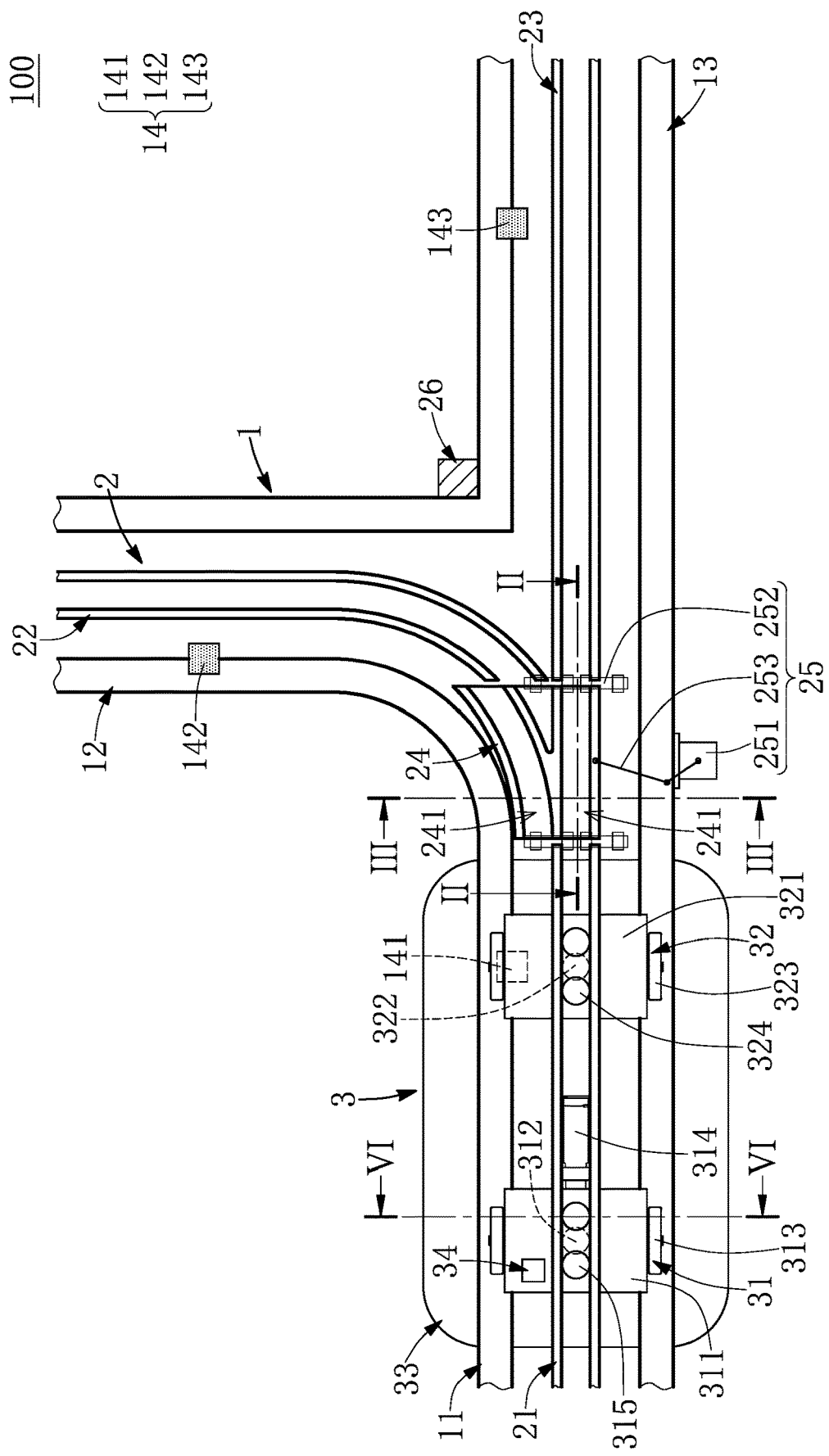
FIG. 1 is a planar view of an overhead hoist transfer (OHT) apparatus according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 8, a first embodiment of the present disclosure provides an overhead hoist transfer (OHT) apparatus 100. The OHT apparatus 100 includes a rail module 1 for being assembled to a factory ceiling, a direction maintaining module 2 assembled in the rail module 1, and an overhead trolley 3 that is movably assembled to the rail module 1 and the direction maintaining module 2.

It should be noted that the rail module 1 and the direction maintaining module 2 in the present embodiment are jointly defined as a guiding device (not labeled in the drawings). Any one of the guiding device and the direction maintaining module 2 can be independently used (e.g., sold) or can be used in cooperation with other components, but the present disclosure is not limited thereto.

Figure 2:
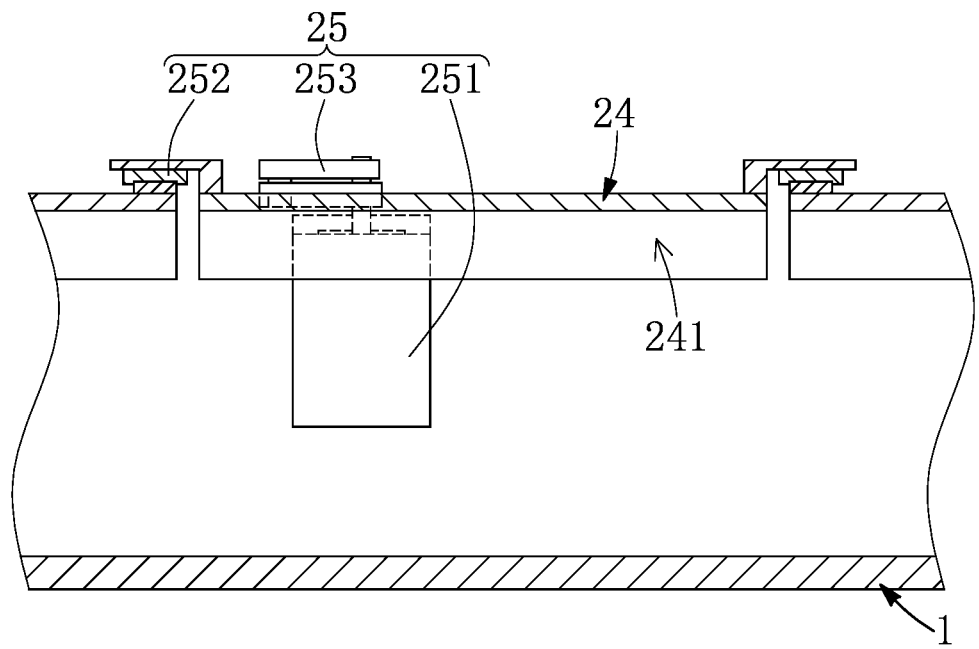
FIG. 2 is a cross-sectional view taken along line II-II of FIG. 1.
Figure 3:
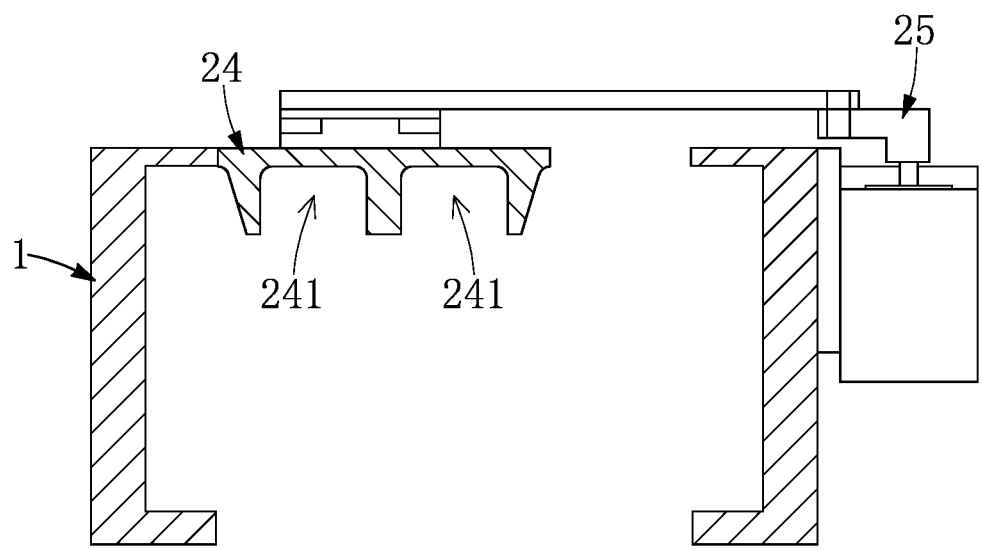
FIG. 3 is a cross-sectional view taken along line III-III of FIG. 1.
Figure 4:
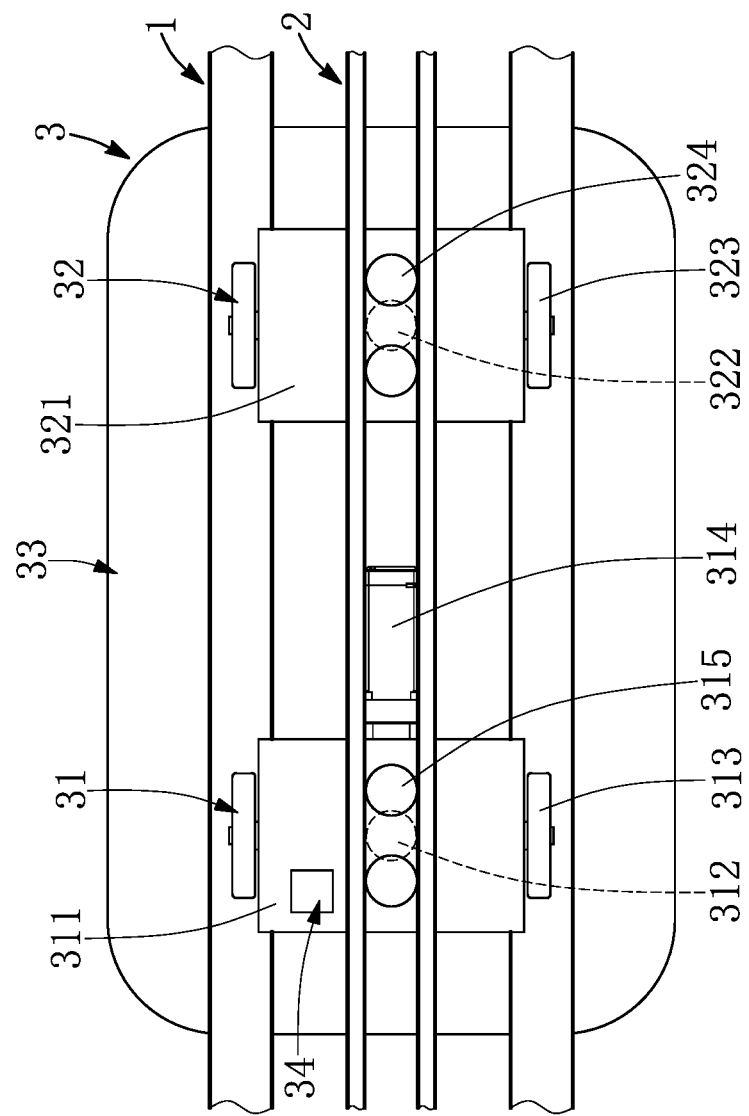
FIG. 4 is an enlarged view showing a portion of FIG. 1.
Figure 5:
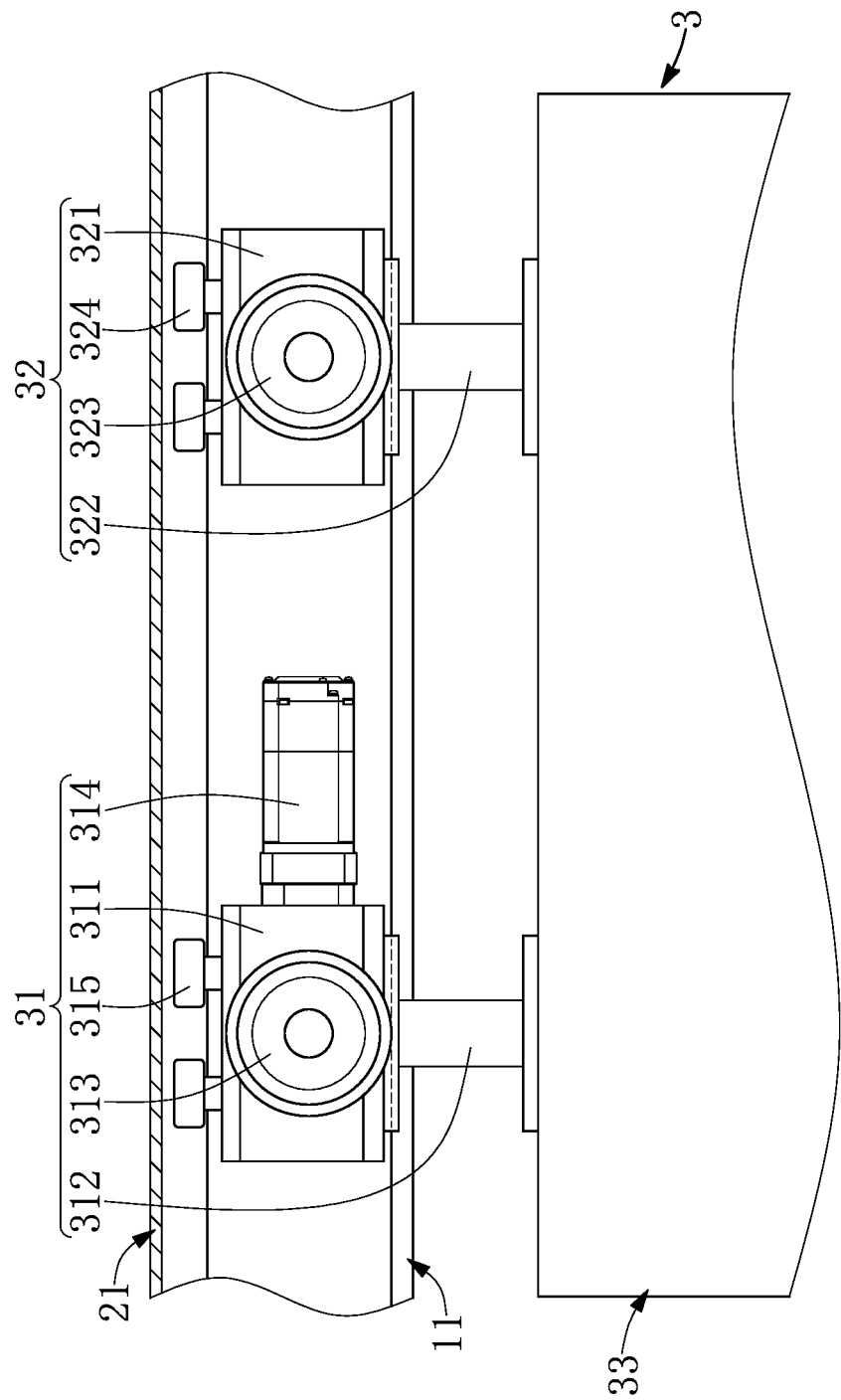
FIG. 5 is a lateral side view of FIG. 4.
Figure 6:
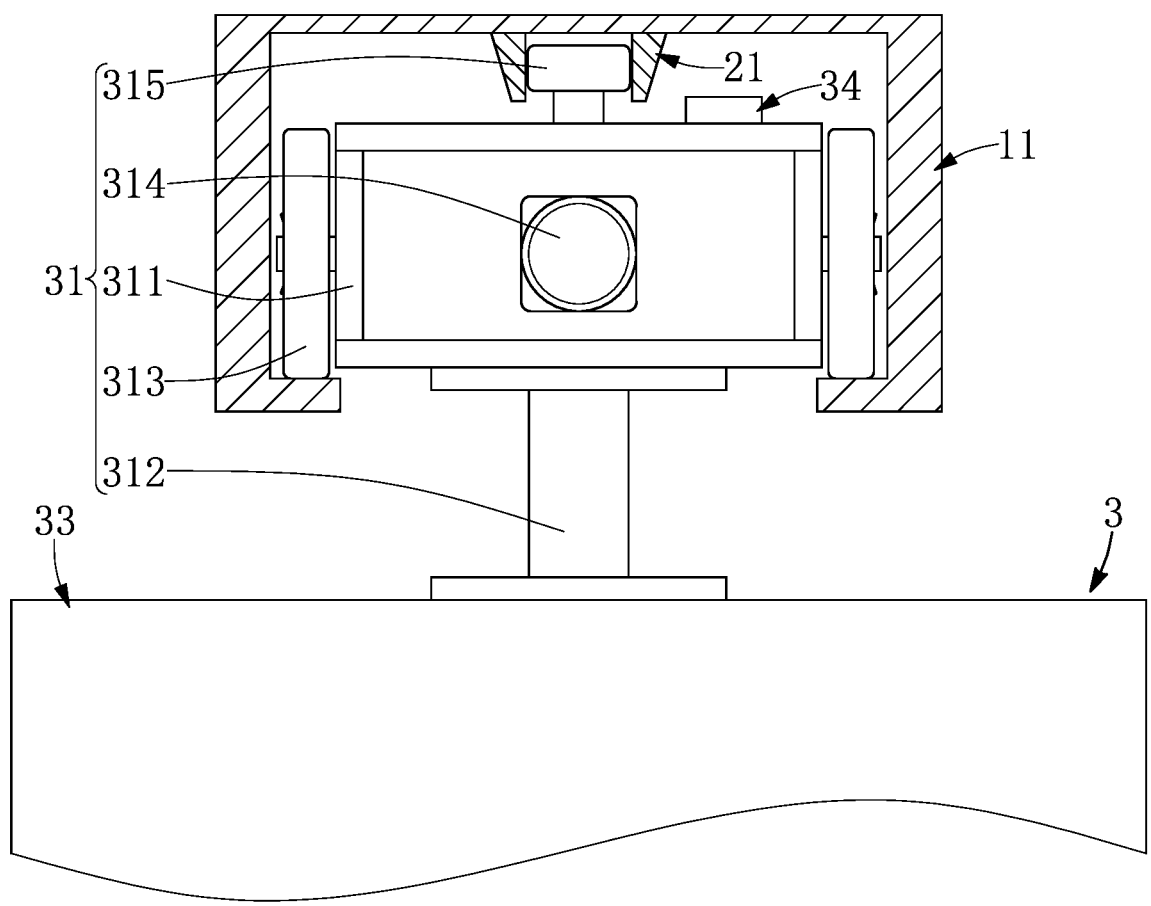
FIG. 6 is a cross-sectional view taken along line VI-VI of FIG. 1.

As shown in FIG. 1 to FIG. 3, the rail module 1 includes a main rail 11, a first rail 12 curvedly connected to the main rail 11, and a second rail 13 that is connected to the main rail 11. The rail module 1 defines a turning path and a straight path. The turning path extends from the main rail 11 to the first rail 12, and the straight path extends from the main rail 11 to the second rail 13. The turning path and the straight path in the present embodiment are defined by regions that the overhead trolley 3 can travel there-through, but the present disclosure is not limited thereto.

Moreover, the main rail 11, the first rail 12, and the second rail 13 in the present embodiment are connected to substantially form a T-shaped structure, but the present disclosure is not limited thereto. For example, in other embodiments of the present disclosure, the main rail 11, the first rail 12, and the second rail 13 can be connected to substantially form a Y-shaped structure; or, the main rail 11 can be further connected to a third rail.

The direction maintaining module 2 includes a main channel 21, a first retaining channel 22 and a second retaining channel 23 that are spaced apart from the main channel 21, a switch channel 24, and a switching mechanism 25 that is connected to the switch channel 24. The main channel 21 is disposed in and extends along the main rail 11, the first retaining channel 22 is disposed in and extends along the first rail 12, and the second retaining channel 23 is disposed in and extends along the second rail 13. The switch channel 24 is disposed among the main channel 21, the first channel 22, and the second channel 23 that are spaced apart from each other.

Figure 7:
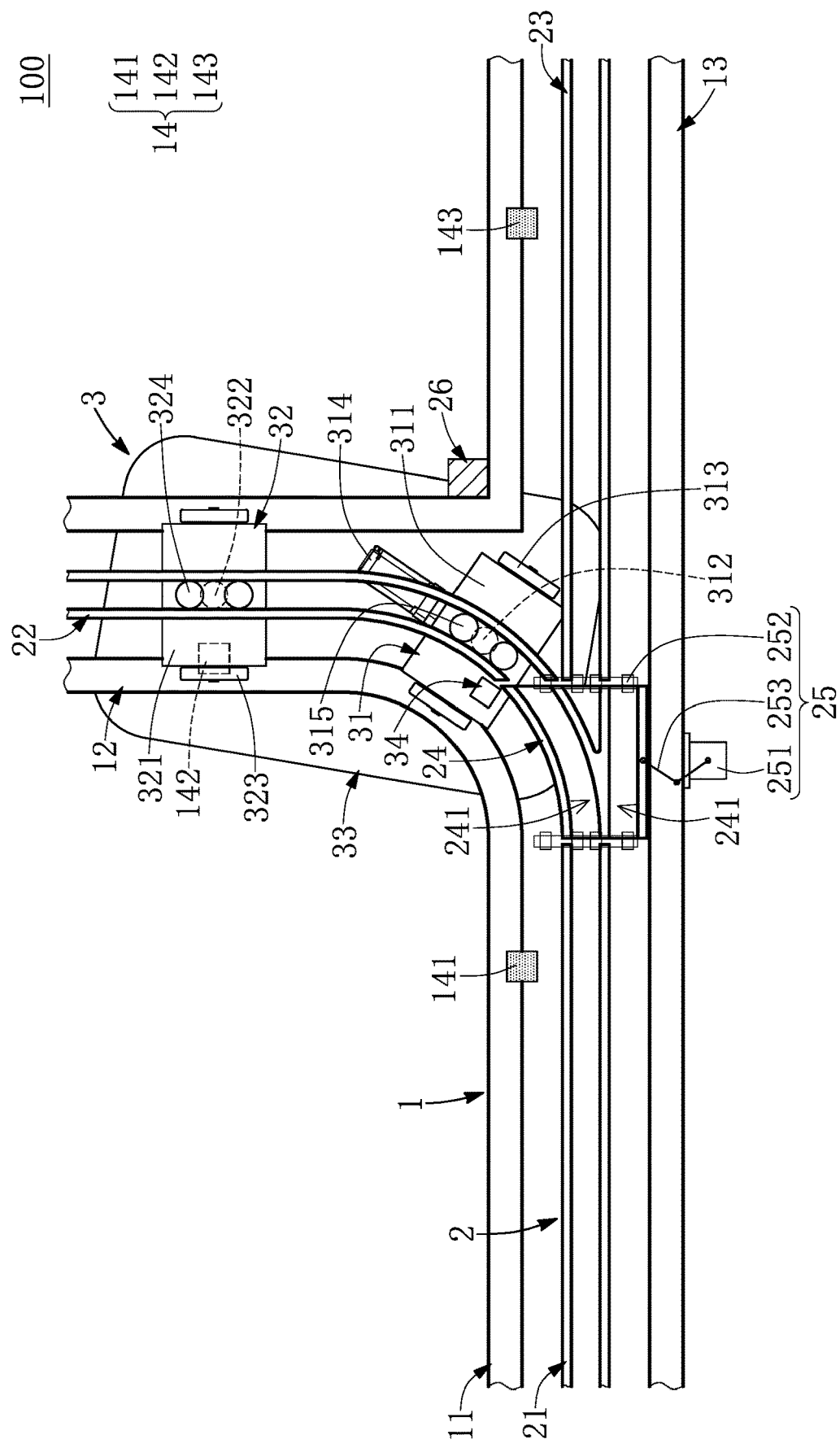
FIG. 7 is a planar view showing an overhead trolley of FIG. 1 traveling along a turning path.
Figure 8:
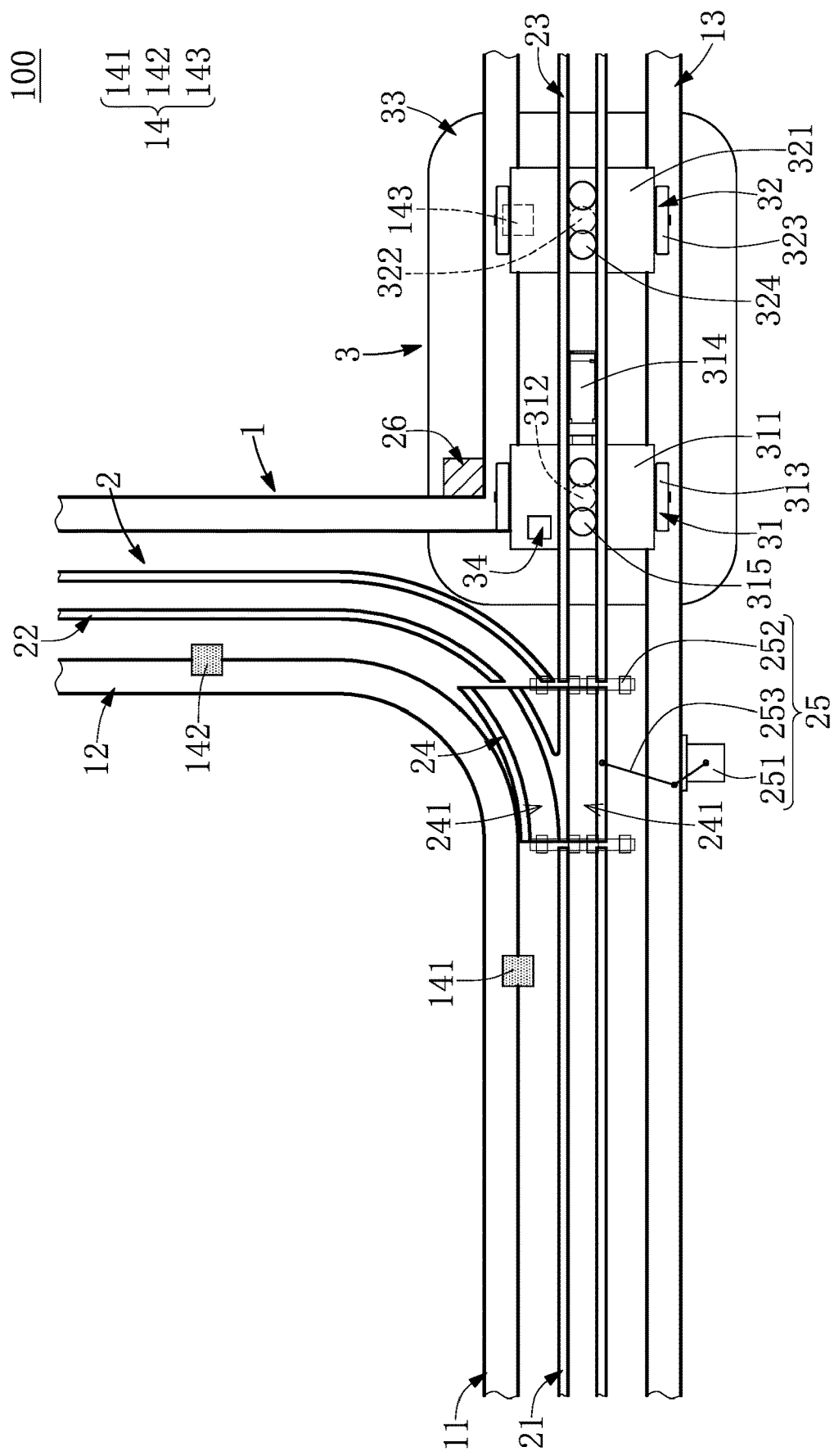
FIG. 8 is a planar view showing the overhead trolley of FIG. 1 traveling along a straight path.

Moreover, the switching mechanism 25 is configured to drive the switch channel 24 to move between a turning position (as shown in FIG. 7) and a straight position (as shown in FIG. 8). When the switch channel 24 is at the turning position, the switch channel 24 connects the main channel 21 and the first retaining channel 22. When the switch channel 24 is at the straight position, the switch channel 24 connects the main channel 21 and the second retaining channel 23.

Specifically, the switch channel 24 in the present embodiment includes two sub-channels 241, and the two sub-channels 241 can be (synchronously) moved in a horizontal plane by the switching mechanism 25. Accordingly, when the switch channel 24 is at the turning position, the switch channel 24 connects the main channel 21 and the first retaining channel 22 through one of the two sub-channels 241; and when the switch channel 24 is at the straight position, the switch channel 24 connects the main channel 21 and the second retaining channel 23 through the other one of the two sub-channels 241, but the present disclosure is not limited thereto.

In addition, the switching mechanism 25 in the present embodiment includes a servomotor 251 assembled to an external side of the rail module 1, a linear guideway assembly 252 connecting the switch channel 24 and the rail module 1, and a linkage member 253 (e.g., a connection rod) that connects the servomotor 251 and the linear guideway assembly 252. The servomotor 251 is configured to drive the switch channel 24 through the linkage member 253 so as to move the switch channel 24 along the linear guideway assembly 252 between the turning position and the straight position, but the present disclosure is not limited thereto. For example, in other embodiments of the present disclosure, the servomotor 251 can be assembled to the factory ceiling; or, the switching mechanism 25 can be formed by other configurations.

As shown in FIG. 1 and FIG. 4 to FIG. 6, the overhead trolley 3 in the present embodiment includes a first walking mechanism 31, a second walking mechanism 32, and a carrying body 33. The carrying body 33 connects the first walking mechanism 31 and the second walking mechanism 32 so as to be hung on the rail module 1. The second walking mechanism 32 is preferably provided without any driving unit, and the first walking mechanism 31 is spaced apart from the second walking mechanism 32, and is configured to move the second walking mechanism 32 only by using the carrying body 33 to be connected to the first walking mechanism 31 and the second walking mechanism 32. In other words, the first walking mechanism 31 can bring the second walking mechanism 32 to jointly move along the rail module 1 through the carrying body 33, but the present disclosure is not limited thereto.

For example, in other embodiments of the present disclosure, the overhead trolley 3 can be provided without the second walking mechanism 32, and the carrying body 33 is connected to the first walking mechanism 31 so as to be hung on the rail module 1; or, the second walking mechanism 32 can include a driving unit.

In the present embodiment, the first walking mechanism 31 includes a first body 311, a first connecting member 312 connecting the first body 311 and the carrying body 33, two driving wheels 313 respectively assembled to two opposite lateral walls of the first body 311, a driving unit 314 received in the first body 311 and connected to the two driving wheels 313, and a first retainer 315 that is assembled on a top wall of the first body 311.

Moreover, one end of the first connecting member 312 is connected to the first body 311, and another end of the first connecting member 312 passes through the rail module 1 to connect the carrying body 33. The driving unit 314 in the present embodiment can synchronously drive the two driving wheels 313 to movably roll on the rail module 1, and the first retainer 315 is movably coupled to the direction maintaining module 2, but the present disclosure is not limited thereto.

For example, in other embodiments of the present disclosure, the driving unit 314 includes two motors configured to respectively and independently drive the two driving wheels 313, and the two motors are capable of respectively driving the two driving wheels 313 to forwardly roll on the rail module 1 by different rolling velocities. Or, the driving unit 314 includes a differential connected to the two driving wheels 313 and a motor that is connected to the differential, and the motor is configured to drive the two driving wheels 313 through the differential so as to be capable of forwardly rolling the two driving wheels 313 on the rail module 1 by different rolling velocities.

The second walking mechanism 32 includes a second body 321 unconnected to the driving unit 314, a second connecting member 322 connecting the second body 321 and the carrying body 33, two driven wheels 323 respectively assembled to two opposite lateral walls of the second body 321, and a second retainer 324 that is assembled on a top wall of the second body 321. One end of the second connecting member 322 is connected to the second body 321, and another end of the second connecting member 322 passes through the rail module 1 to connect the carrying body 33.

Moreover, the two driven wheels 323 are movably disposed on the rail module 1, and the second retainer 324 is movably coupled to the direction maintaining module 2. The first retainer 315 and the second retainer 324 in the present embodiment can be cooperated with the direction maintaining module 2 in the following manners. Each of the first retainer 315 and the second retainer 324 includes at least one roller that is rollable in the main channel 21, the first retaining channel 22, the second retaining channel 23, or the switch channel 24, but the present disclosure is not limited thereto.

As shown in FIG. 1 and FIG. 7, when the two driving wheels 313 and the two driven wheels 323 of the overhead trolley 3 are moved from the main rail 11 to the first rail 12 along the turning path, the switch channel 24 is at the turning position, so that the first retainer 315 and the second retainer 324 are moved from the main channel 21 to the first retaining channel 22 through the switch channel 24.

Moreover, as shown in FIG. 1 and FIG. 8, when the two driving wheels 313 and the two driven wheels 323 of the overhead trolley 3 are moved from the main rail 11 to the second rail 13 along the straight path, the switch channel 24 is at the straight position, so that the first retainer 315 and the second retainer 324 are moved from the main channel 21 to the second retaining channel 23 through the switch channel 24.

Accordingly, in the OHT apparatus 100 of the present embodiment, the switch channel 24 can be driven by the switching mechanism 25 so as to selectively connect the main channel 21 to one of the first retaining channel 22 and the second retaining channel 23, thereby facilitating the overhead trolley 3 to accurately move along the direction maintaining module 2 through the first retainer 315 (and the second retainer 324).

Specifically, as shown in FIG. 1, FIG. 7, and FIG. 8, the direction maintaining module 2 includes a receiver 26 electrically coupled to the switching mechanism 25, and the overhead trolley 3 includes an emitter 34 configured to wirelessly transmit a signal to the receiver 26. The emitter 34 is configured to transmit a switching signal to the receiver 26, so that the switching mechanism 25 is allowed to move the switch channel 24 to the straight position or the turning position.

Furthermore, in order to accurately drive the switching mechanism 25, the rail module 1 includes a plurality of marks 14 disposed on the main rail 11, the first rail 12, and the second rail 13. The marks 14 in the present embodiment include a bifurcation mark 141, a turn mark 142, and a straight mark 143.

The bifurcation mark 141 is disposed on the main rail 11 and is arranged adjacent to the first rail 12. In other words, one of the marks 14 on the main rail 21 adjacent to the first rail 12 (and the second rail 13) is defined as the bifurcation mark 141; or, a last one of the marks 14 on the main rail 11 is defined as the bifurcation mark 141.

Moreover, the turn mark 142 is disposed on the first rail 12, and the turn mark 142 corresponds in position to a portion of the first rail 12 that carries the first walking mechanism 31 (just) crossing the switch channel 24. The straight mark 143 is disposed on the second rail 13, and the straight mark 143 corresponds in position to a portion of the second rail 13 that carries the first walking mechanism 31 (just) crossing the switch channel 24.

Specifically, after the overhead trolley 3 detects the bifurcation mark 141 (e.g., the bifurcation mark 141 can be detected by the overhead trolley 3 after the overhead trolley 3 crosses a penultimate one of the marks 14 on the main rail 11; in other words, the bifurcation mark 141 can be detected by the overhead trolley 3 before the overhead trolley 3 crosses the bifurcation mark 141), the emitter 34 is configured to emit the switching signal to the receiver 26, thereby moving the switch channel 24 by the switching mechanism 25. Moreover, the overhead trolley 3 is configured to confirm whether the switching signal is correctly executed by detecting the turn mark 142 or the straight mark 143.

Accordingly, the switching mechanism 25 in the present embodiment is driven by the emitter 34 of the overhead trolley 3, thereby increasing the operation performance of the OHT apparatus 100, but the present disclosure is not limited thereto. For example, in other embodiments of the present disclosure, the switching mechanism 25 can be driven by a mechanism (e.g., a control center) other than the overhead trolley 3.

Second Embodiment

Referring to FIG. 9 to FIG. 14, a second embodiment of the present disclosure is similar to the first embodiment of the present disclosure. For the sake of brevity, descriptions of the same components in the first and second embodiments of the present disclosure will be omitted herein, and the following description only discloses different features between the first and second embodiments.

As shown in FIG. 1, FIG. 7, and FIG. 8 of the first embodiment, when the first retainer 315 and the second retainer 324 of the overhead trolley 3 are moved to a position adjacent to the switch channel 24, at least one of the two driving wheels 313 and/or at least one of the two driven wheels 323 of the overhead trolley 3 is not in contact with the rail module 1 and is in a suspension state.

Figure 9:
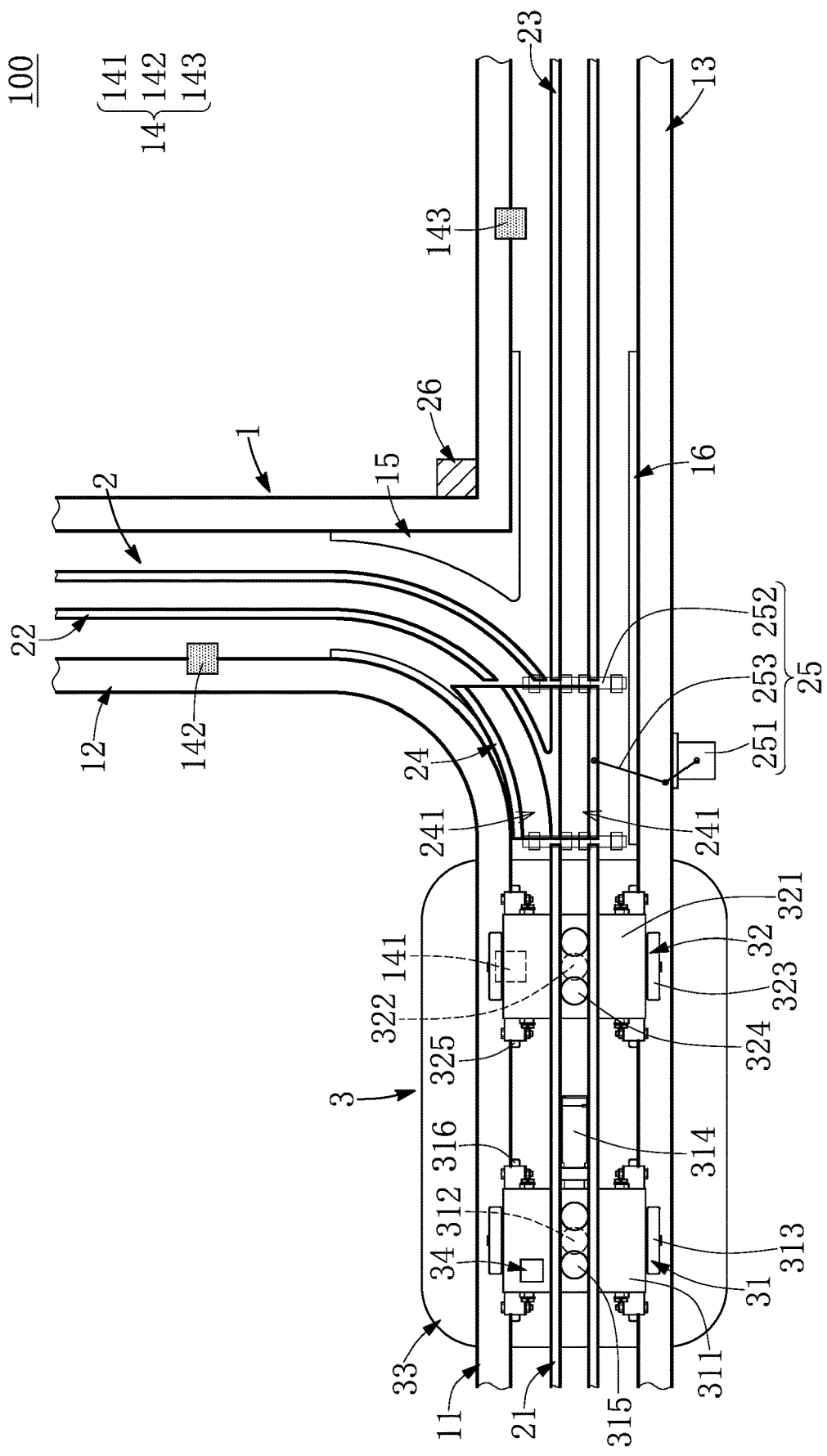
FIG. 9 is a planar view of an OHT apparatus according to a second embodiment of the present disclosure.
Figure 14:
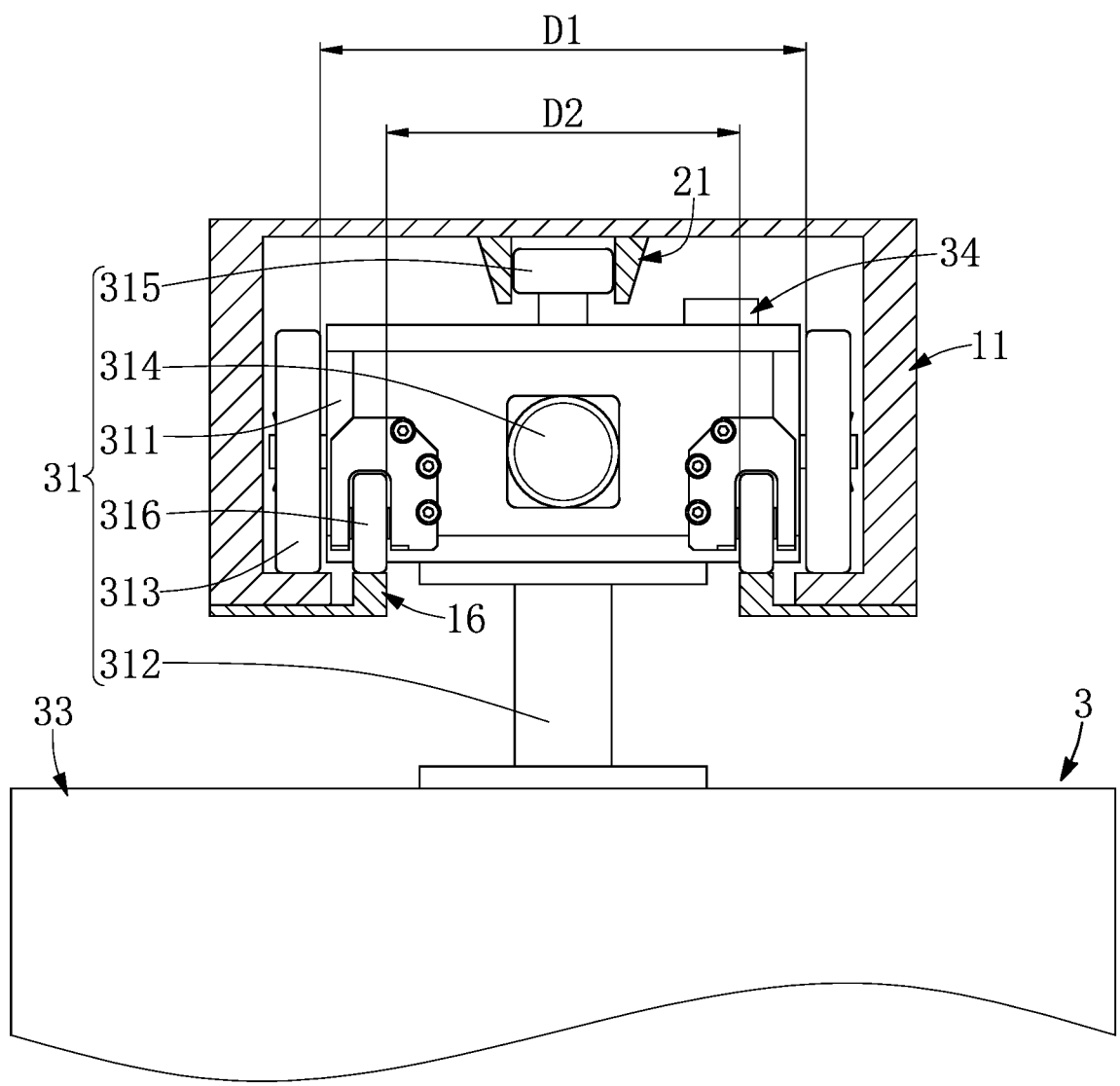
FIG. 14 is a cross-sectional view taken along line XIV-XIV of FIG. 13.

Accordingly, as shown in FIG. 9 of the present embodiment, the rail module 1 includes a first extension rail 15 connected to the first rail 12 and a second extension rail 16 that is connected to the second rail 13. The first extension rail 15 is arranged at the turning path and the straight path, and the second extension rail 16 is arranged only at the straight path. Specifically, a top side of the first extension rail 15 and a top side of the first rail 12 adjacent thereto are substantially flush with each other (or have the same height), and a top side of the second extension rail 16 and a top side of the second rail 13 adjacent thereto are substantially flush with each other (or have the same height) (as shown in FIG. 14).

In other words, the first extension rail 15 and the second extension rail 16 are arranged adjacent to the switch channel 24, and the position of at least one of the first extension rail 15 and the second extension rail 16 corresponds to an area of the rail module 1, such that at least one of the two driving wheels 313 and/or at least one of the two driven wheels 323 is in the suspension state, but the present disclosure is not limited thereto.

Figure 10:
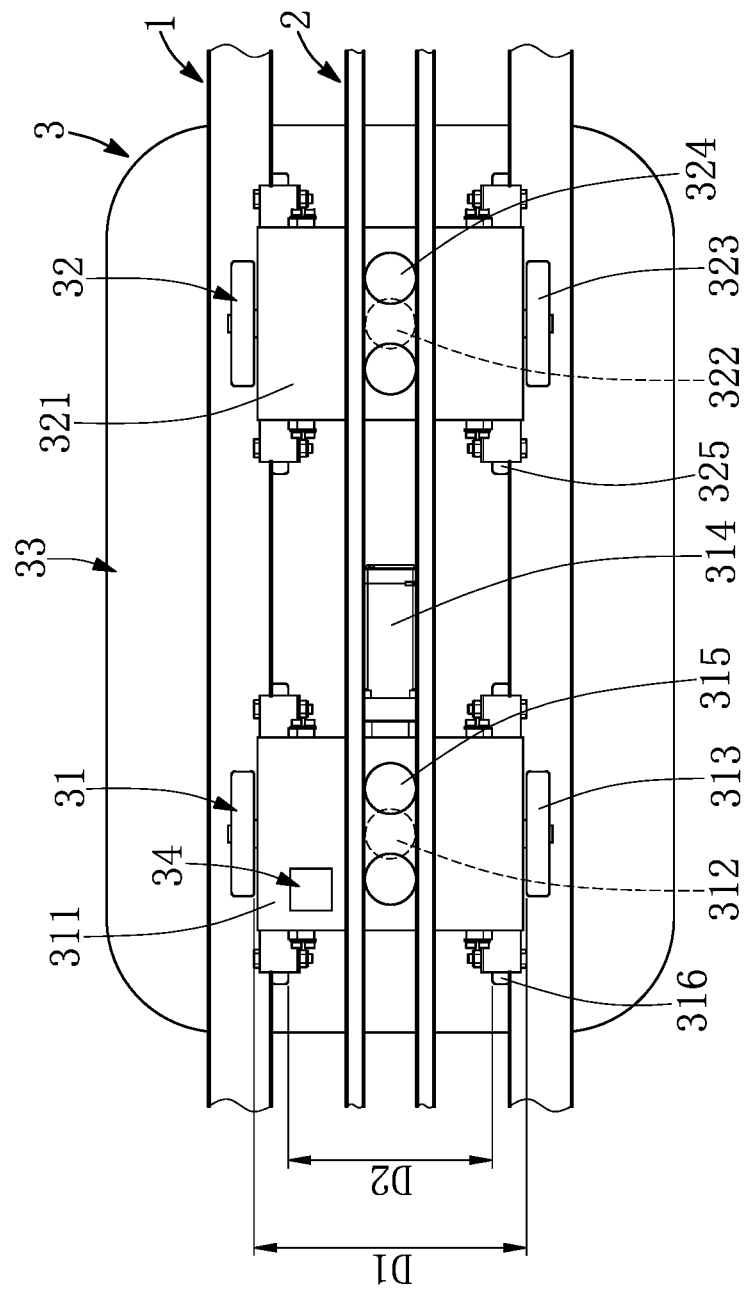
FIG. 10 is an enlarged view showing a portion of FIG. 9.
Figure 11:
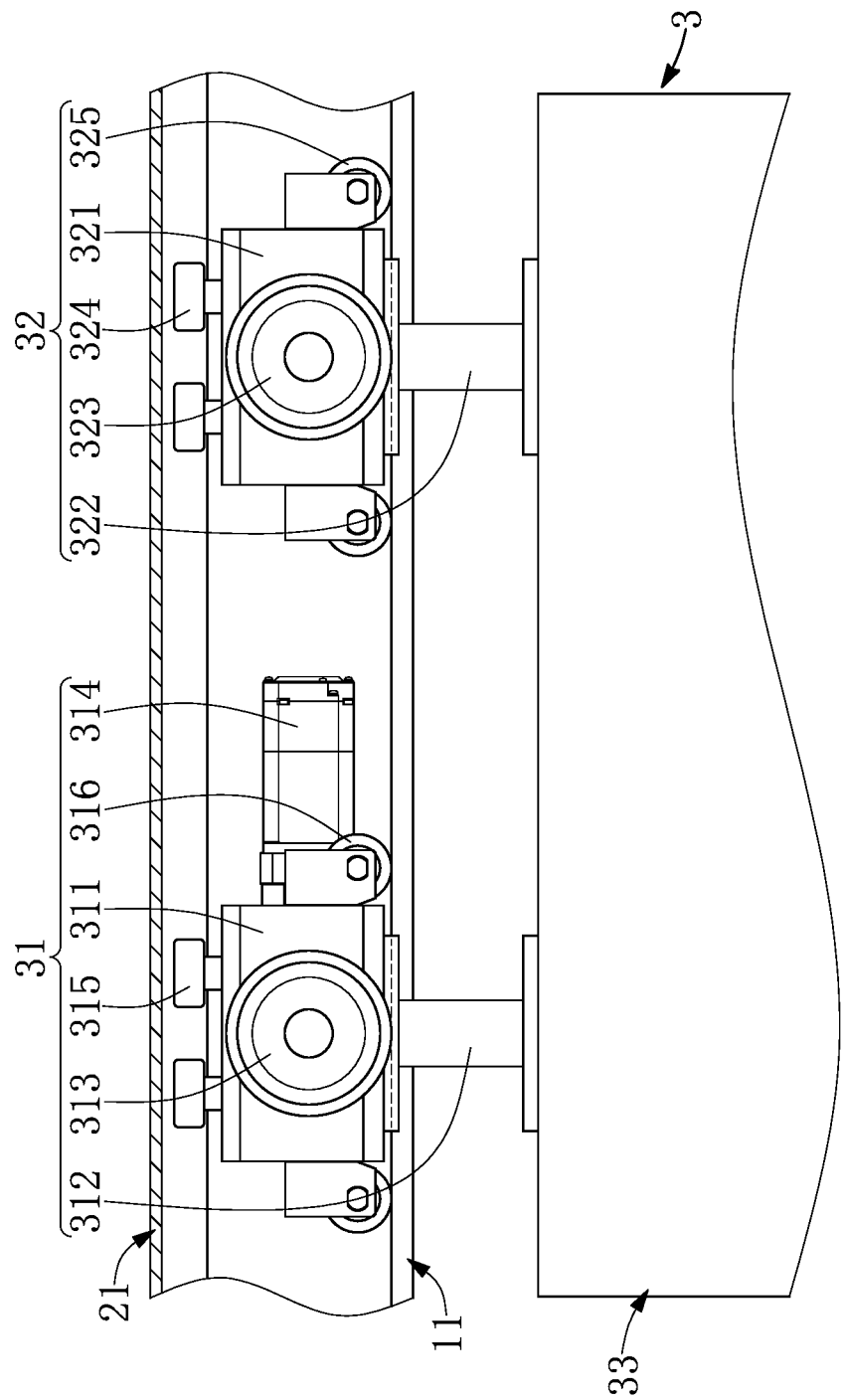
FIG. 11 is a lateral side view of FIG. 10.

Moreover, as shown in FIG. 9 to FIG. 11, the first walking mechanism 31 of the overhead trolley 3 includes a plurality of first auxiliary wheels 316 assembled to a bottom wall of the first body 311 and arranged between the two driving wheels 313. In other words, the two driving wheels 313 face each other and have a first distance D1 there-between, two of the first auxiliary wheels 316 adjacent to each other face each other and have a second distance D2 there-between, and the first distance D1 is greater than the second distance D2.

In addition, the second walking mechanism 32 of the overhead trolley 3 includes a plurality of second auxiliary wheels 325 assembled to a bottom wall of the second body 321 and arranged between the two driven wheels 323, but the present disclosure is not limited thereto. For example, in other embodiments of the present disclosure, the second walking mechanism 32 of the overhead trolley 3 can be provided without the second auxiliary wheels 325; or, the overhead trolley 3 can be provided without the second walking mechanism 32.

Figure 12:
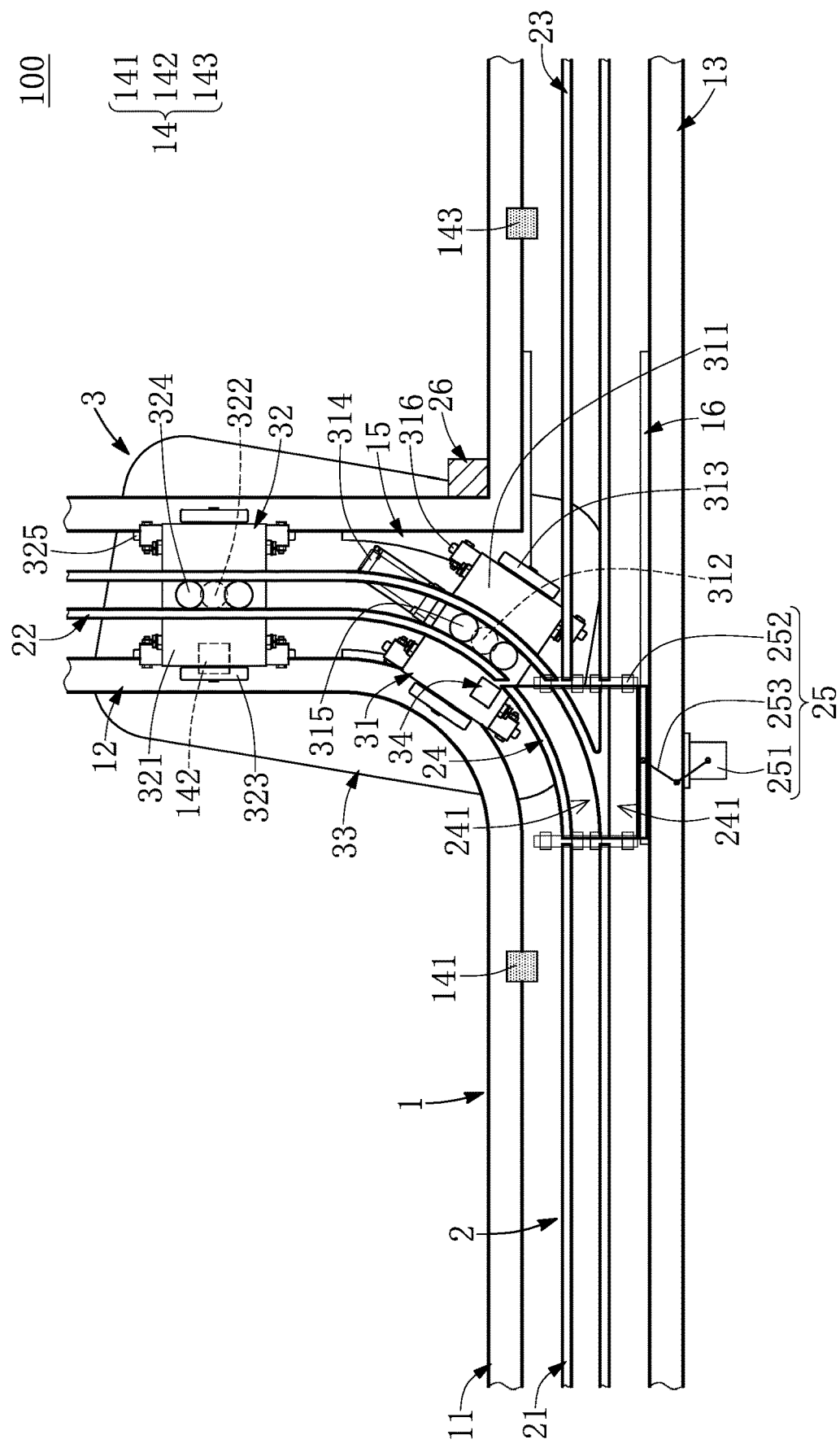
FIG. 12 is a top view showing an overhead trolley of FIG. 9 traveling along a turning path.

Specifically, any one of the first auxiliary wheels 316 (or the second auxiliary wheels 325) is not in contact with the main rail 11, the first rail 12, and the second rail 13. In other words, as shown in FIG. 9 and FIG. 12, when the overhead trolley 3 is moved from the main rail 11 to the first rail 12 along the turning path, the first auxiliary wheels 316 and the second auxiliary wheels 325 can forwardly roll on the first extension rail 15, so that a distance defined by the overhead trolley 3 in a suspension state traveling along the turning path can be reduced.

Figure 13:
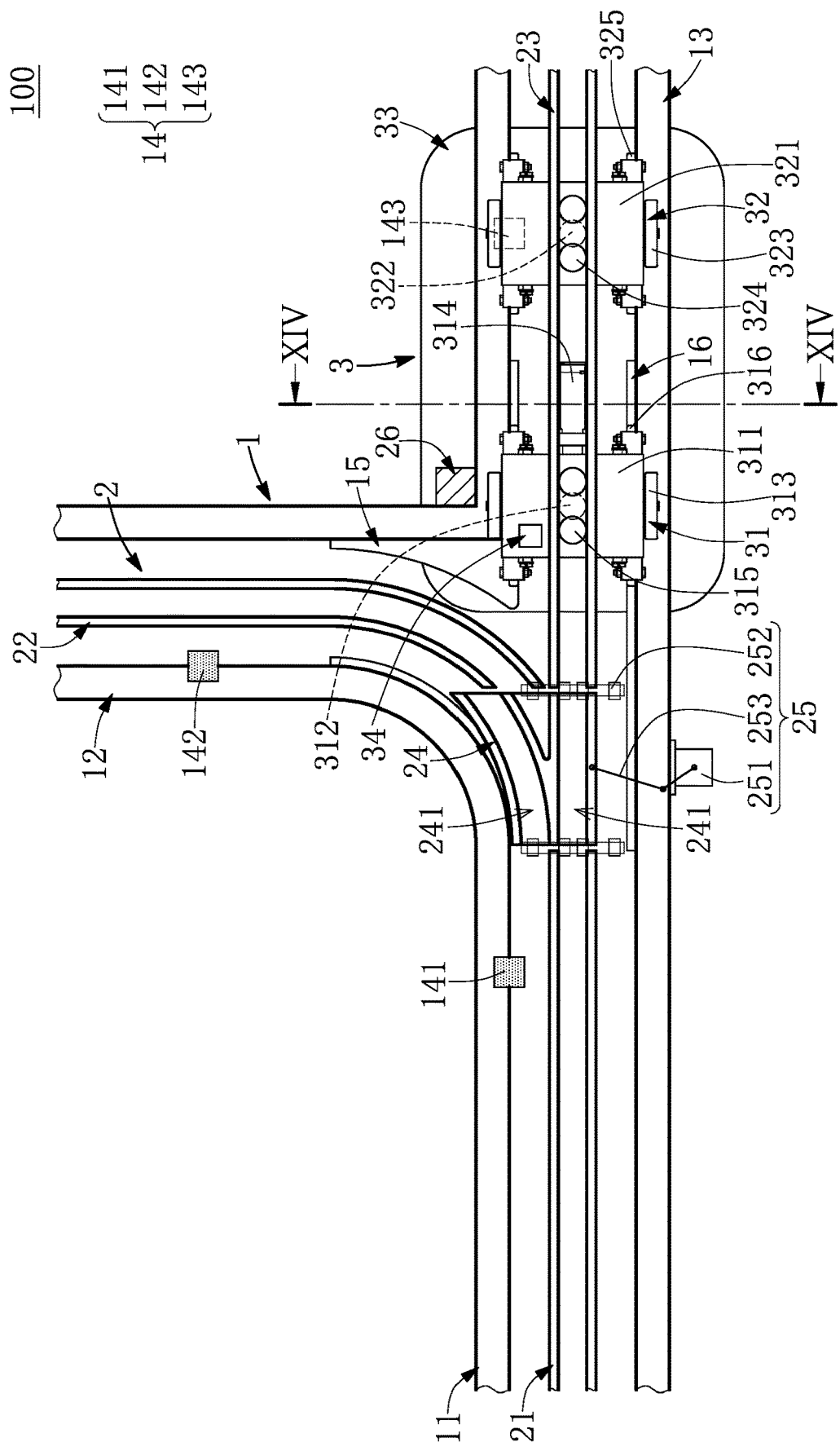
FIG. 13 is a top view showing the overhead trolley of FIG. 9 traveling along a straight path.

Moreover, as shown in FIG. 9, FIG. 13, and FIG. 14, when the overhead trolley 3 is moved from the main rail 11 to the second rail 13 along the straight path, at least one of the first auxiliary wheels 316 and at least one of the second auxiliary wheels 325 can forwardly roll on the first extension rail 15 and the second extension rail 16, so that a distance defined by the overhead trolley 3 in a suspension state traveling along the straight path can be reduced. In other words, the overhead trolley 3 can be moved from the main rail 11 to the first rail 12 or the second rail 13 through the first extension rail 15. However, the second extension rail 16 in the present embodiment is configured to provide at least one of the first auxiliary wheels 316 and at least one of the second auxiliary wheels 325 to travel thereon only when the overhead trolley 3 is moved from the main rail 11 to the second rail 13.

In conclusion, in each of the OHT apparatus, the guiding device, and the direction maintaining module of the present disclosure, the switch channel can be driven by the switching mechanism so as to selectively connect the main channel to one of the first retaining channel and the second retaining channel, thereby facilitating the overhead trolley to accurately move along the direction maintaining module through the first retainer (and the second retainer).

Moreover, in the OHT apparatus of the present disclosure, the first extension rail and the second extension rail of the rail module are provided to be used in cooperation with the first auxiliary wheels and the second auxiliary wheels of the overhead trolley so as to effectively reduce a distance defined by the overhead trolley in a suspension state traveling along the turning path or the straight path, thereby increasing the stability of the overhead trolley.

Furthermore, in the OHT apparatus of the present disclosure, the switching mechanism can be driven by the emitter of the overhead trolley, thereby increasing the operation performance of the OHT apparatus.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An overhead hoist transfer (OHT) apparatus, comprising:
   a rail module including:
      a main rail;
      a first rail curvedly connected to the main rail, wherein the rail module defines a turning path extending from the main rail to the first rail; and
      a second rail connected to the main rail, wherein the rail module defines a straight path extending from the main rail to the second rail;
   a direction maintaining module assembled in the rail module and including:
      a main channel disposed in and extending along the main rail;
      a first retaining channel disposed in and extending along the first rail;
      a second retaining channel disposed in and extending along the second rail, wherein the main channel is spaced apart from the first retaining channel and the second retaining channel by a gap;
      a switch channel arranged in the gap and disposed among the main channel, the first channel, and the second channel, wherein the main channel is discontinuous from the switch channel; and
      a switching mechanism connected to the switch channel and configured to drive the switch channel to move between a turning position and a straight position, wherein, when the switch channel is at the turning position, the switch channel connects the main channel and the first retaining channel, and wherein, when the switch channel is at the straight position, the switch channel connects the main channel and the second retaining channel; and
   an overhead trolley movably assembled to the rail module and the direction maintaining module and including:
      a first walking mechanism including two driving wheels movably disposed on the rail module, a driving unit connected to the two driving wheels, and a first retainer that is movably coupled to the direction maintaining module; and
      a carrying body connected to the first walking mechanism and hung on the rail module;
   wherein, when the overhead trolley is moved from the main rail to the first rail along the turning path, the switch channel is arranged at the turning position, so that the first retainer is moved from the main channel to the first retaining channel through the switch channel; and
   wherein, when the overhead trolley is moved from the main rail to the second rail along the straight path, the switch channel is arranged at the straight position, so that the first retainer is moved from the main channel to the second retaining channel through the switch channel.

2. The OHT apparatus according to claim 1, wherein the switching mechanism includes:
   a servomotor assembled to the rail module;
   a linear guideway assembly connecting the switch channel and the rail module; and
   a linkage member connecting the servomotor and the linear guideway assembly, wherein the servomotor is configured to drive the switch channel through the linkage member so as to move the switch channel along the linear guideway assembly between the turning position and the straight position.

3. The OHT apparatus according to claim 1, wherein the rail module includes a first extension rail connected to the first rail and arranged at the turning path and the straight path, and wherein, when the overhead trolley is moved from the main rail to the first rail or the second rail, the overhead trolley travels through the first extension rail.

4. The OHT apparatus according to claim 3, wherein the rail module includes a second extension rail connected to the second rail and arranged only at the straight path, wherein the first walking mechanism includes a plurality of first auxiliary wheels, and any one of the first auxiliary wheels is not in contact with the main rail, the first rail, and the second rail, and wherein the second extension rail is configured to provide at least one of the first auxiliary wheels to travel thereon only when the overhead trolley is moved from the main rail to the second rail.

5. The OHT apparatus according to claim 4, wherein the two driving wheels face each other and have a first distance there-between, two of the first auxiliary wheels adjacent to each other face each other and have a second distance there-between, and the first distance is greater than the second distance.

6. The OHT apparatus according to claim 4, wherein the first walking mechanism includes:
   a first body receiving the driving unit therein, wherein the two driving wheels are respectively assembled to two opposite lateral walls of the first body, the first retainer is assembled on a top wall of the first body, and the first auxiliary wheels are assembled to a bottom wall of the first body; and a first connecting member, wherein one end of the first connecting member is connected to the first body, and another end of the first connecting member passes through the rail module to connect to the carrying body.

7. The OHT apparatus according to claim 1, wherein the direction maintaining module includes a receiver electrically coupled to the switching mechanism, and the overhead trolley includes an emitter configured to wirelessly transmit a signal to the receiver, and wherein the emitter is configured to transmit a switching signal to the receiver, so that the switching mechanism is allowed to move the switch channel to the straight position or the turning position.

8. The OHT apparatus according to claim 7, wherein the rail module includes:
    a bifurcation mark disposed on the main rail and arranged adjacent to the first rail;
    a turn mark disposed on the first rail, wherein the turn mark corresponds in position to a portion of the first rail that carries the first walking mechanism crossing the switch channel; and
    a straight mark disposed on the second rail, wherein the straight mark corresponds in position to a portion of the second rail that carries the first walking mechanism crossing the switch channel;
    wherein, after the overhead trolley detects the bifurcation mark, the emitter is configured to emit the switching signal to the receiver, and the overhead trolley is configured to confirm whether the switching signal is correctly executed by detecting the turn mark or the straight mark.

9. The OHT apparatus according to claim 1, wherein the overhead trolley includes a second walking mechanism provided without any driving unit, wherein the second walking mechanism includes two driven wheels movably disposed on the rail module and a second retainer that is movably coupled to the direction maintaining module, and wherein the carrying body is hung on the rail module by being connected to the first walking mechanism and the second walking mechanism.

10. The OHT apparatus according to claim 9, wherein the first walking mechanism is configured to move the second walking mechanism only by using the carrying body that is connected to the first walking mechanism and the second walking mechanism.

11. The OHT apparatus according to claim 9, wherein the first walking mechanism includes:
    a first body receiving the driving unit, wherein the two driving wheels are respectively assembled to two opposite lateral walls of the first body, and the first retainer is assembled on a top wall of the first body; and
    a first connecting member, wherein one end of the first connecting member is connected to the first body, and another end of the first connecting member passes through the rail module to connect the carrying body.

12. The OHT apparatus according to claim 11, wherein the second walking mechanism includes:
    a second body unconnected to the driving unit, wherein the two driven wheels are respectively assembled to two opposite lateral walls of the second body, and the second retainer is assembled on a top wall of the second body; and
    a second connecting member, wherein one end of the second connecting member is connected to the second body, and another end of the second connecting member passes through the rail module to connect the carrying body.

13. A guiding device of an overhead hoist transfer apparatus, comprising:
    a rail module including:
        a main rail;
        a first rail curvedly connected to the main rail, wherein the rail module defines a turning path extending from the main rail to the first rail; and
        a second rail connected to the main rail, wherein the rail module defines a straight path extending from the main rail to the second rail; and
    a direction maintaining module assembled in the rail module and including:
        a main channel disposed in and extending along the main rail;
        a first retaining channel disposed in and extending along the first rail;
        a second retaining channel disposed in and extending along the second rail, wherein the main channel is spaced apart from the first retaining channel and the second retaining channel by a gap;
        a switch channel arranged in the gap and disposed among the main channel, the first channel, and the second channel, wherein the main channel is discontinuous from the switch channel; and
        a switching mechanism connected to the switch channel and configured to drive the switch channel to move between a turning position and a straight position, wherein, when the switch channel is arranged at the turning position, the switch channel connects the main channel and the first retaining channel, and wherein, when the switch channel is arranged at the straight position, the switch channel connects the main channel and the second retaining channel.

14. The guiding device according to claim 13, wherein the switching mechanism includes:
    a servomotor assembled to the rail module;
    a linear guideway assembly connecting the switch channel and the rail module; and
    a linkage member connecting the servomotor and the linear guideway assembly, wherein the servomotor is configured to drive the switch channel through the linkage member so as to move the switch channel along the linear guideway assembly between the turning position and the straight position.

15. The guiding device according to claim 13, wherein the rail module includes a first extension rail connected to the first rail and arranged at the turning path and the straight path.

16. The guiding device according to claim 15, wherein the rail module includes a second extension rail connected to the second rail and arranged only at the straight path.

17. A direction maintaining module of an overhead hoist transfer apparatus for being assembled in a rail module, the direction maintaining module comprising:
    a main channel;
    a first retaining channel;
    a second retaining channel, wherein the main channel is spaced apart from the first retaining channel and the second retaining channel by a gap;
    a switch channel arranged in the gap and disposed among the main channel, the first channel, and the second channel, wherein the main channel is discontinuous from the switch channel; and
    a switching mechanism connected to the switch channel and configured to drive the switch channel to move between a turning position and a straight position, wherein, when the switch channel is arranged at the turning position, the switch channel connects the main channel and the first retaining channel, and wherein, when the switch channel is arranged at the straight position, the switch channel connects the main channel and the second retaining channel.

18. The direction maintaining module according to claim 17, wherein the switching mechanism includes:
a servomotor for being assembled to the rail module;
a linear guideway assembly for connecting the switch channel to the rail module; and
a linkage member connecting the servomotor and the linear guideway assembly, wherein the servomotor is configured to drive the switch channel through the linkage member so as to move the switch channel along the linear guideway assembly between the turning position and the straight position.

* * * * *